United States Patent
Kemmerling et al.

(10) Patent No.: US 11,111,834 B2
(45) Date of Patent: Sep. 7, 2021

(54) METHODS AND SYSTEMS FOR A MIXING CHAMBER

(71) Applicant: Ford Global Technologies, LLC, Dearborn, MI (US)

(72) Inventors: Joerg Kemmerling, Monschau (DE); Helmut Matthias Kindl, Aachen (DE); Vanco Smiljanovski, Bedburg (DE); Hanno Friederichs, Aachen (DE); Franz Arnd Sommerhoff, Aachen (DE); Andreas Kuske, Geulle (NL); Frank Wunderlich, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 16/598,884

(22) Filed: Oct. 10, 2019

(65) Prior Publication Data

US 2020/0123950 A1 Apr. 23, 2020

(30) Foreign Application Priority Data

Oct. 18, 2018 (DE) .................. 102018217842.9

(51) Int. Cl.
*F01N 3/20* (2006.01)
*F01N 5/04* (2006.01)

(52) U.S. Cl.
CPC .............. *F01N 3/206* (2013.01); *F01N 5/04* (2013.01); *F01N 2550/05* (2013.01); *F01N 2610/08* (2013.01); *F01N 2610/1453* (2013.01)

(58) Field of Classification Search
CPC ........ F01N 3/206; F01N 3/208; F01N 3/2892; F01N 3/2066; F01N 3/36; F01N 3/0253; F01N 5/04; F01N 2610/02; F01N 2610/03; F01N 2610/08; F01N 2610/1453; F01N 2550/05; F01N 2230/06; F01N 2240/20; F02B 37/18; F01D 25/24; Y02T 10/12; Y02T 10/40
USPC ......... 60/274, 277, 280, 286, 295, 299–301, 60/297, 311
See application file for complete search history.

(56) References Cited

U.S. PATENT DOCUMENTS

| 6,883,308 B2 * | 4/2005 | Megas ............... B01D 53/9431 60/280 |
| 8,347,611 B2 | 1/2013 | Hepburn et al. |
| 8,596,063 B2 | 12/2013 | Brown et al. |
| 9,255,516 B2 * | 2/2016 | Kawashima .......... F01N 3/0253 |
| 2017/0252698 A1 | 9/2017 | Zhang et al. |

FOREIGN PATENT DOCUMENTS

| CN | 1936286 A | 3/2007 | |
| DE | 102005045029 A1 | 3/2007 | |
| JP | 2013122243 A | 6/2013 | |
| WO | 2018171833 A1 | 9/2018 | |
| WO | WO-2020014564 A1 * | 1/2020 | ............. F02B 37/00 |

* cited by examiner

*Primary Examiner* — Audrey K Bradley
*Assistant Examiner* — Dapinder Singh
(74) *Attorney, Agent, or Firm* — Geoffrey Brumbaugh; McCoy Russell LLP

(57) ABSTRACT

Methods and systems are provided for a mixing chamber in a turbine. In one example, a system comprises a mixing chamber integrally formed within a turbine with an injector positioned to inject reductant directly into the mixing chamber.

19 Claims, 3 Drawing Sheets

METHODS AND SYSTEMS FOR A MIXING CHAMBER

CROSS REFERENCE TO RELATED APPLICATION

The present application claims priority to German patent application No. 102018217842.9, filed on Oct. 18, 2018. The entire contents of the above-listed application are hereby incorporated by reference for all purposes.

FIELD

The present description relates generally to a mixing chamber integrally formed in a turbocharger.

BACKGROUND/SUMMARY

With increasingly stringent emissions standards, components utilized for aftertreatment purposes may begin to occupy a greater volume of space in an engine compartment. To this effect, there is a demand to decrease a packaging size of aftertreatment systems while still meeting emissions standards.

An issue with aftertreatment systems may include mixing of reductants in the exhaust gas for sufficient reduction of catalytic devices. However, this issue is exacerbated due to the continued compaction of modern aftertreatment system. Once example approach shown by Stiermann in C.N. 1,936,286. Therein, a reductant mixing chamber is integrally formed in a turbocharger. The mixing chamber receives high-pressure exhaust gas from upstream of a turbine blade to mix with a reductant spray within the chamber, wherein the mixture is directed to a portion of the turbine downstream of the turbine blade.

However, the inventors have found some issues with the solution above. First, by arranging the mixing chamber to receive exhaust gas from upstream of the turbine, boost may be lost and thereby decrease an efficiency of the engine. This issue may further include complex controls and algorithms to account for the portion of exhaust gas that does not spin the turbine for other engine routines and estimations. Second, the injector used to spray the reductant within the chamber needs to be a high-pressure injector to overcome a pressure of the exhaust gas, which increases a cost of manufacturing the turbocharger.

The inventors have found a way to at least partially solve the issues described above. In one example, an internal combustion engine with an exhaust gas discharge system for discharging exhaust gas from at least one cylinder, the internal combustion engine, comprising at least one exhaust gas aftertreatment system is arranged in the exhaust gas discharge system, a device is positioned to inject a reducing agent into a mixing chamber upstream of the at least one exhaust gas aftertreatment system, and a turbine is arranged in the exhaust gas discharge system upstream of the at least one exhaust gas aftertreatment system, wherein a turbine casing contains at least one impeller mounted on a rotatable shaft, wherein an inlet region is upstream of and supplies exhaust gas to the at least one impeller and an outlet region is downstream of discharges exhaust gas from the at least one impeller, and at least one flow channel fluidly couples the inlet region to the outlet region via the impeller, wherein the mixing chamber is fluidly coupled to the at least one flow channel at a portion of the turbine upstream of the outlet region and downstream of the at least one impeller via at least one exhaust gas supply line. In this way, a cost of manufacturing the mixing chamber may be reduced.

In one example, a runner diverts a portion of exhaust gas downstream of the turbine blade to the mixing chamber. In response to a catalyst being oxidized and demanding a reducing agent, the injector may inject reductant into the mixing chamber, wherein the portion of exhaust gas may mix with the reductant, wherein a plurality of apertures expel the mixture into a turbine outlet to flow to an exhaust passage housing the catalyst.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
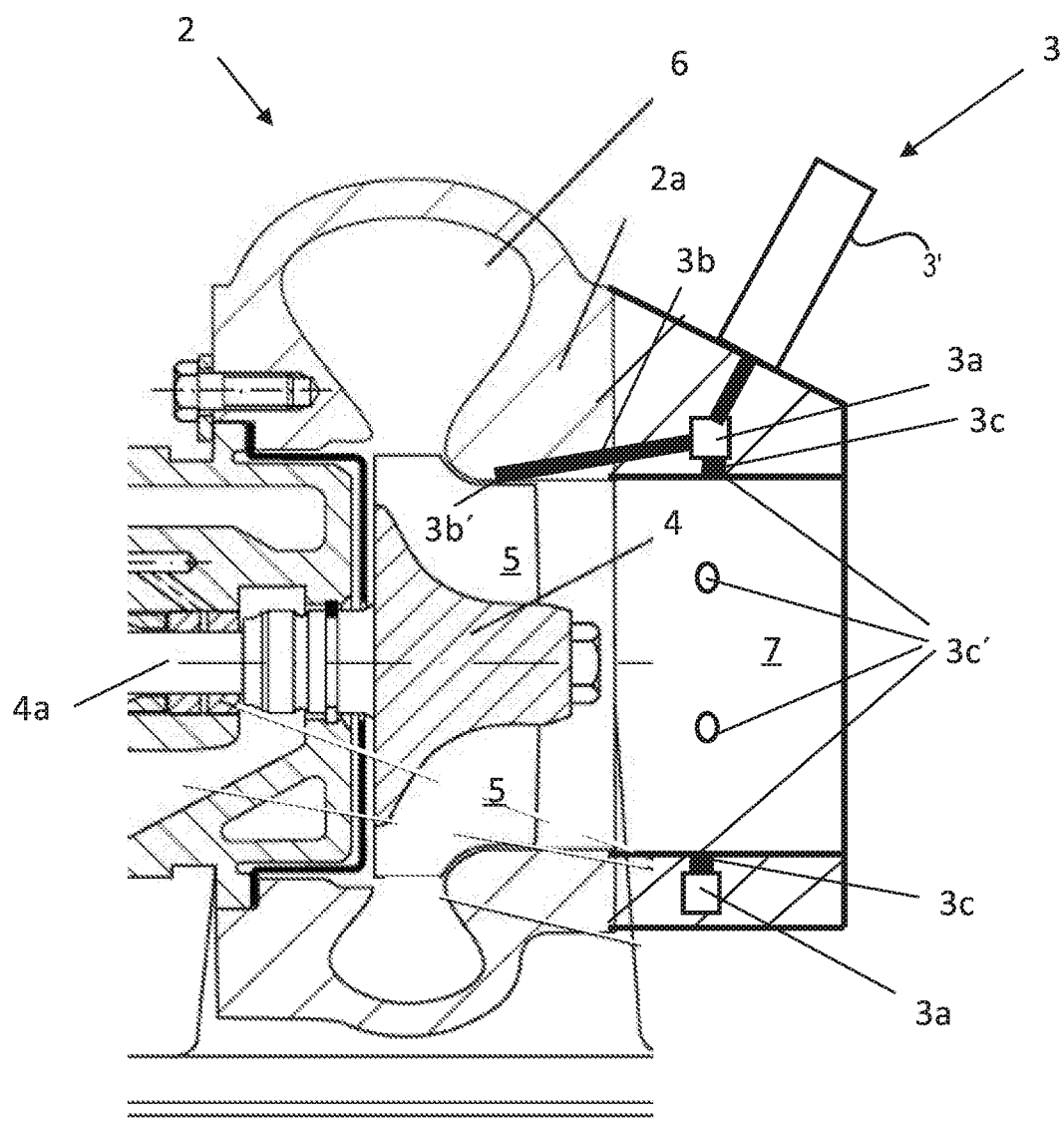
FIG. 1 a first embodiment of the turbine arranged in the exhaust gas discharge system, in a partial section along the shaft of the turbine impeller.
Figure 2:
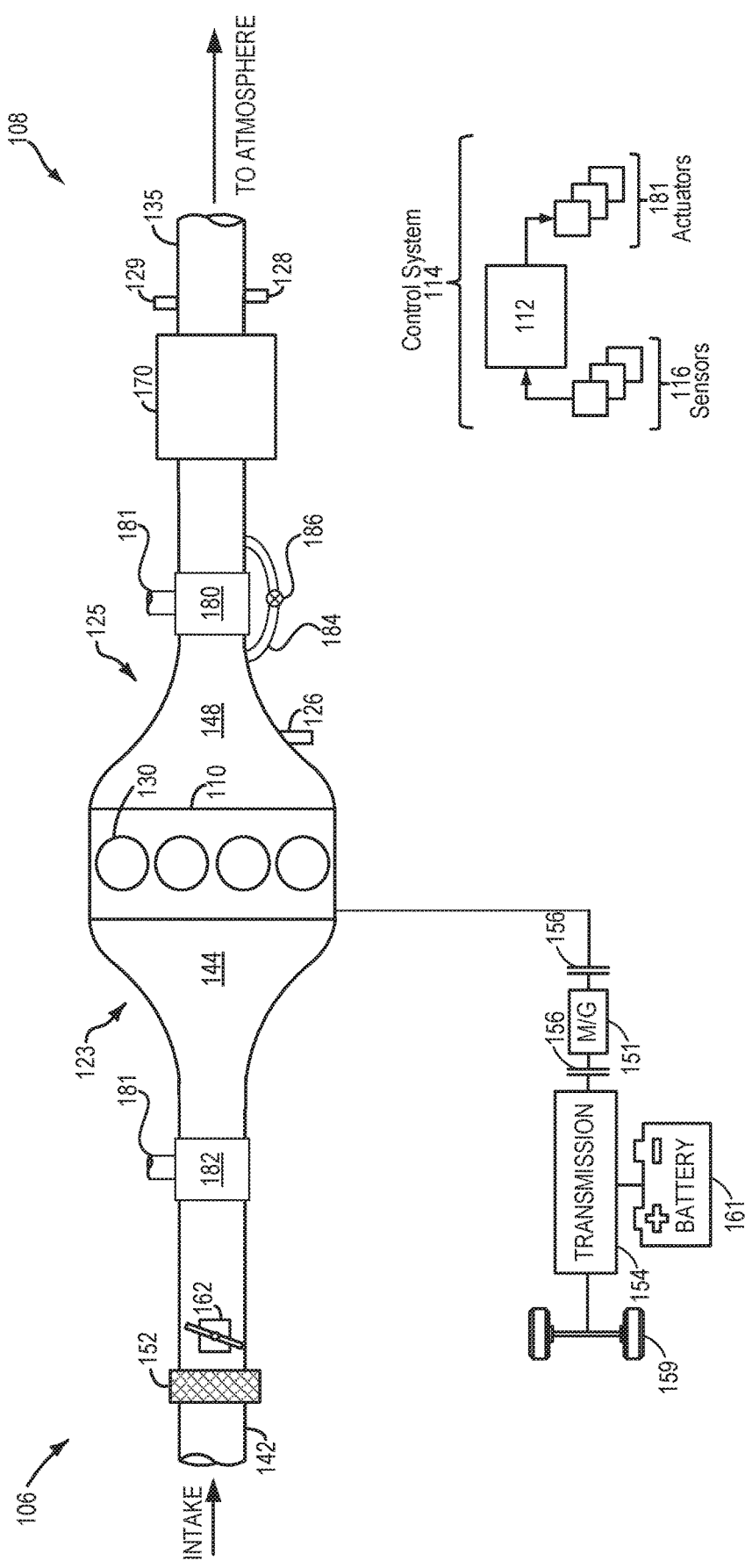
FIG. 2 illustrates a schematic of an engine included in a hybrid vehicle.
Figure 3:
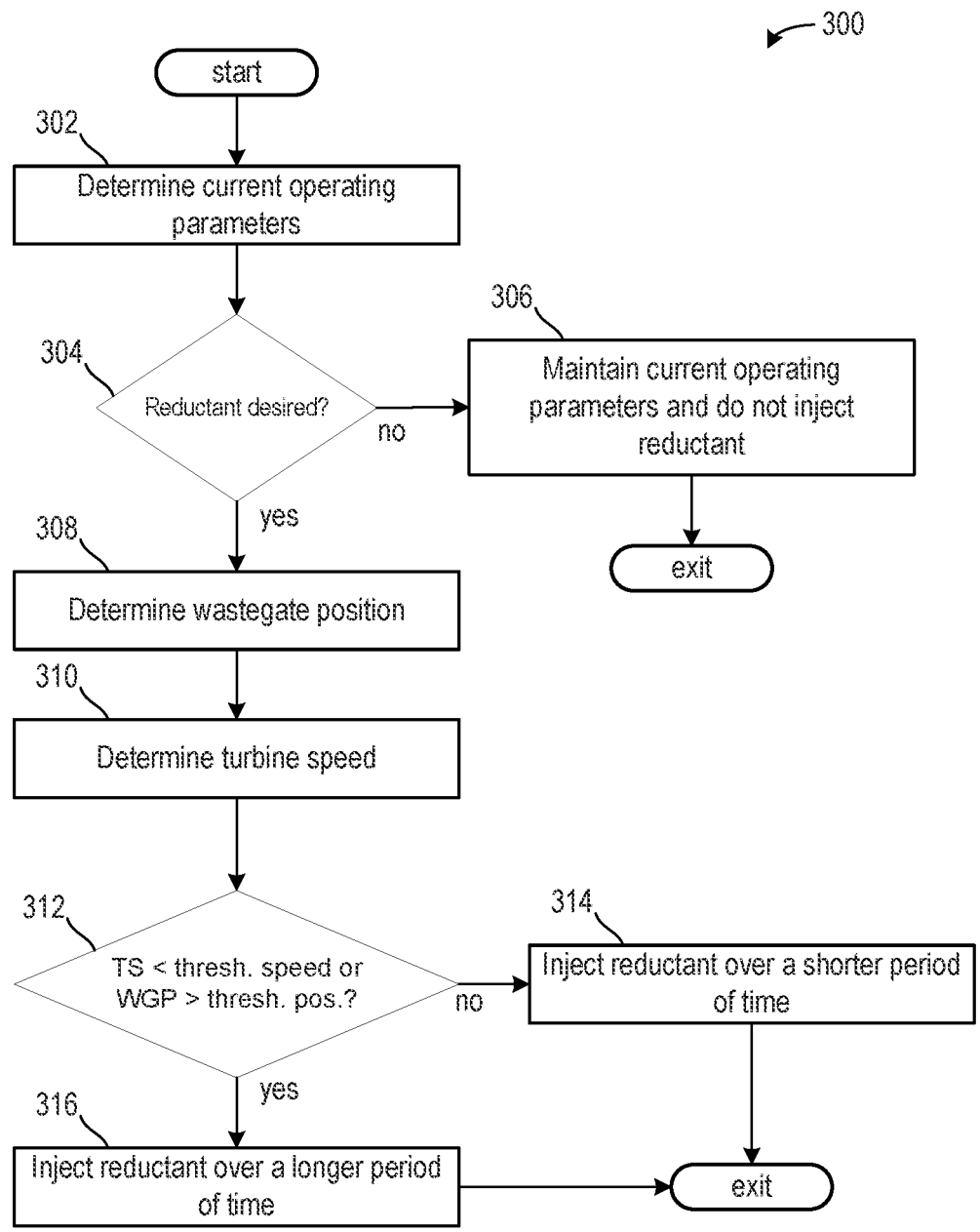
FIG. 3 illustrates a method for adjusting a reductant injection in response to a turbine wheel speed and/or a wastegate position.

The following description relates to systems and methods for mixing reductant with exhaust gas within a mixing chamber integrally formed in a turbine case. The mixing chamber arranged in the turbine case is illustrated in FIG. 1. An engine included in a hybrid vehicle, which may utilize boost from a turbocharger comprising the turbine and may comprise a catalyst capable of utilizing the reductant mixture is illustrated in FIG. 2. FIG. 3 illustrates a method for adjusting a reductant injection in response to a turbine wheel speed and/or a wastegate position.

In one example, internal combustion engines are used for example as motor vehicle drives. In the context of the present disclosure, the term internal combustion engine may refer to diesel engines, gasoline engines and hybrid internal combustion engines, for example, internal combustion engines operated with a hybrid combustion process, and hybrid drives which, as well as the internal combustion engine, comprise at least one further torque source for driving a motor vehicle, for example an electric motor which is or can be connected to the internal combustion engine for drive purposes and which emits power instead of or in addition to the internal combustion engine.

In vehicle engine systems, catalytic converters are used to oxidize HCs and COs at a range of temperatures by use of catalytic materials which increase the speed of certain reactions. If nitrogen oxide $NO_x$ is also to be reduced, this can be achieved by use of a three-way catalytic converter, which however for this desires stoichiometric operation of the gasoline engine ($\lambda \approx 1$) within narrow limits. Here, the nitrogen oxides $NO_x$ are reduced via the non-oxidized exhaust gas components present, namely the carbon monoxides CO and the unburnt hydrocarbons HC, wherein these exhaust gas components are oxidized at the same time.

As is known to those of ordinary skill in the art, and in the context of the present disclosure, the air ratio $\lambda$ is defined as the ratio of the air mass actually supplied to the at least one cylinder of the internal combustion engine, to the stoichiometric air mass which would be demanded to completely oxidize the fuel mass supplied to the at least one cylinder ($\lambda_{stoich}=1$).

In internal combustion engines operated with an air surplus, for example direct-injection diesel engines or direct-injection petrol engines, the nitrogen oxides $NO_x$ present in the exhaust gas cannot be reduced because of the operating principle, for example, because of the absence of reducing agent.

Consequently, an exhaust gas aftertreatment system may be provided for reducing the nitrogen oxides, for example a storage catalyst, also known as a lean $NO_x$ trap (LNT). Here, the nitrogen oxides are initially adsorbed in the catalyst, wherein the catalyst may collect and store nitrogen oxides during lean operation ($\lambda>1$) of the internal combustion engine, in order then to be reduced during a regeneration phase, for example via sub-stoichiometric operation ($\lambda<1$) of the internal combustion engine with an oxygen deficit, wherein the unburnt hydrocarbons HC and the carbon monoxide CO present in the exhaust gas serve as reducing agents.

Further engine-internal possibilities for enriching the exhaust gas with reducing agent, in particular with unburnt hydrocarbons, are exhaust gas recirculation (EGR) and choking the charge air in the intake system. Both measures reduce the charge air mass or fresh air mass conducted through the internal combustion engine, and thereby reduce the air ratio $\lambda$. Enrichment occurs due to a reduction of the air mass provided.

With regard to the sub-stoichiometric operation ($\lambda<1$) of the internal combustion engine, (e.g., enrichment of the exhaust gas), it may not be possible when desired or only possible with restrictions, to introduce and maintain sub-stoichiometric operation. There may be many reasons for this, which vary depending on the momentary load with which the internal combustion engine is operated.

One reason may include combustion at low loads, wherein stable combustion cannot be ensured with rich operation, in particular on use of compression ignition. Ignition misfires or incomplete combustion of the mixture may occur. The consequence is undesirably high pollutant emissions, in particular of unburnt hydrocarbons HC. In the mid-load range, a load change frequently occurs. The transient operating conditions may make it difficult to maintain a constant air ratio and make enrichment difficult in some cases. In the region of high, relatively high and very high loads, sub-stoichiometric operation may be governed by the maximum permitted exhaust gas temperature, wherein the exhaust gas temperature is often limited by components present in the exhaust gas discharge system or their thermal load capacity, for example the turbine of an exhaust gas turbocharger, an exhaust gas aftertreatment system, or the exhaust gas recirculation. In this context, it should be recalled that the exhaust gas temperature normally rises on enrichment.

Enrichment of the exhaust gas with unburnt hydrocarbons, also known as HC enrichment, may also be achieved by post-injection of additional fuel into at least one cylinder of the internal combustion engine. The injected fuel is not ignited in the combustion chamber by the main combustion which is still in progress, or by the high combustion gas temperatures present even after the end of main combustion, but is conducted unburnt into the exhaust gas discharge system upstream of the catalytic converter during the load change.

Internal combustion engines using post-injection may be susceptible to dilution or contamination of the oil by unburnt hydrocarbons. Depending on the quantity of post-injected fuel and the injection time, a varying proportion of the post-injected fuel reaches the cylinder inner wall where it mixes with the adhering oil film and thus contributes to oil dilution.

Engine-internal measures may be omitted if the reducing agent is introduced directly into the exhaust gas discharge system, for example by injection upstream of the exhaust gas aftertreatment system which for at least part of the time demands a supply of reducing agent. As such, the reducing agent may not participate in the combustion process.

In the internal combustion engine and the method which are the subject of the present disclosure, for exhaust gas enrichment, reducing agent is introduced into the exhaust gas discharge system upstream of the at least one exhaust gas aftertreatment system. Further measures for exhaust gas enrichment, in particular engine-internal measures, may however also be provided.

A storage catalyst is only one example of an exhaust gas aftertreatment system which demands a supply of reducing agent for at least part of the time. Instead of or in addition to a storage catalyst, a selective catalyst, such as a selective catalytic reduction (SCR) catalyst, may be provided to reduce the nitrogen oxides. In relation to the supply of reducing agent, the statements made concerning storage catalysts may still apply. Suitable reducing agents may include unburnt hydrocarbons, ammonia ($NH_3$), and urea, which may be used for selective reduction of nitrogen oxides. The latter reducing agents are introduced into the exhaust gas in targeted fashion, which may be directly into the exhaust gas discharge system.

To minimize the emission of soot particles, so-called regenerative particle filters may be used which filter the soot particles out of the exhaust gas and store them, wherein these soot particles may be intermittently burned during regeneration of the filter. For this, oxygen or an air surplus in the exhaust gas is desired to oxidize the soot in the filter, which can be achieved for example by super-stoichiometric operation ($\lambda>1$) of the internal combustion engine.

Temperatures of around 550° C. are desired to regenerate the particle filter in the absence of catalytic support are only achieved in operation at high loads and high rotation speeds. Therefore, additional measures may be used to guarantee regeneration of the filter under all operating conditions.

The particle filter may be heated by the injection of additional fuel into the exhaust gas discharge system, wherein the injected film is oxidized or burned in the exhaust gas discharge system so that the exhaust gas temperature is increased upstream of or inside the particle filter.

To this extent, the particle filter is a further example of an exhaust gas aftertreatment system which for at least part of the time demands a supply of reducing agent such as fuel.

The issues which may arise from enrichment via engine-internal measures or post-injection can be avoided by introducing the reducing agent directly into the exhaust gas discharge system. But this concept for enriching the exhaust gas with reducing agent also demands particular precautions, since it is desirable to ensure an adequate mixing of the introduced reducing agent with the hot exhaust gas (e.g., a maximum homogenization). According to previous examples, the reducing agent is therefore introduced into the exhaust gas discharge system at a great distance upstream of the exhaust gas aftertreatment system, whereby a sufficiently long mixing line is achieved. This measure however counters a dense packaging of the drive unit.

In addition, the path of the hot exhaust gases to the exhaust gas aftertreatment system is extended, despite the fact that, in principle, the exhaust gas route should be a short as possible so that the exhaust gases have little time to cool down and the exhaust gas aftertreatment systems reach their operating temperature or light-up temperature as quickly as possible, in particular after cold start of the internal combustion engine. The thermal inertia of the part of the exhaust gas discharge system between the cylinder outlets and the exhaust gas aftertreatment system disadvantageously increases.

In the context of the above, it is an object of the present disclosure to provide an internal combustion engine which is improved with regard to exhaust gas aftertreatment.

A further partial object of the present disclosure is to provide a method for operating such an internal combustion engine.

The first partial object is achieved by an internal combustion engine with an exhaust gas discharge system for discharging exhaust gas from at least one cylinder, in which at least one exhaust gas aftertreatment system, which requires a supply of reducing agent for at least part of the time, is arranged in the exhaust gas discharge system, a device is provided for introducing a reducing agent into the exhaust gas discharge system upstream of the at least one exhaust gas aftertreatment system, and a turbine is arranged in the exhaust gas discharge system upstream of the at least one exhaust gas aftertreatment system, with a turbine casing which contains at least one impeller mounted on a rotatable shaft and which comprises an inlet region for the supply of exhaust gas and an outlet region for the discharge of exhaust gas, wherein the inlet region is situated upstream of the at least one impeller and the outlet region belonging to the exhaust gas discharge system is situated downstream of the at least one impeller, and at least one flow channel is provided which carries an exhaust gas and connects the inlet region to the outlet region via the impeller, and wherein the turbine casing comprises at least one mixing chamber which is connected to at least one flow channel carrying exhaust gas upstream of the outlet region via at least one exhaust gas supply line, and which is connected to the exhaust gas discharge system downstream of the at least one impeller via at least one metering line, wherein reducing agent can be introduced into the at least one mixing chamber via the device.

According to the disclosure, the at least one turbine of the internal combustion engine is equipped with at least one mixing chamber in which both hot exhaust gas and reducing agent are introduced and mixed.

For this, at least one mixing chamber is integrated in the turbine casing, into which exhaust gas is conducted from the impeller region of the turbine, which may be from a flow channel leading through the impeller. Reducing agent is then introduced into the hot exhaust gas present in the mixing chamber, by means of the device for introducing reducing agent. The exhaust gas and the reducing agent mix, wherein the mixture of exhaust gas and reducing agent is introduced into the exhaust gas discharge system downstream of the at least one impeller. In this way, the exhaust gas is enriched with reducing agent upstream of the at least one exhaust gas aftertreatment system.

In one example, the exhaust gas is conveyed from the exhaust gas discharge system into the mixing chamber and, together with the reducing agent, back into the exhaust gas discharge system under pressure.

Firstly, a positive driving pressure gradient exists between the exhaust gas extraction point in the impeller region and the point at which the mixture of exhaust gas and reducing agent is introduced into the exhaust gas discharge system, since the exhaust gas expands on passage through the turbine or impeller.

Secondly, an effect applies which results from the introduction of reducing agent into the hot exhaust gas. If liquid reducing agent is used, the introduced reducing agent evaporates. The evaporation heat is extracted from the hot exhaust gas. This is associated with a temperature fall. Due to the evaporation of the introduced reducing agent, the pressure in the mixing chamber and the pressure of the exhaust gas/reducing agent mixture, and hence the pressure difference between the mixing chamber and the exhaust gas discharge system, increase downstream of the at least one impeller, wherein this pressure difference, as the driving pressure gradient, conveys the exhaust gas/reducing agent mixture into the exhaust gas discharge system. In individual cases, namely on use of a liquid reducing agent, an additional self-conveying effect is created which is due to or based on the fact that the increased pressure in the gaseous exhaust gas/reducing agent mixture tends to reduce.

The effects and processes described above also promote the mixing of the exhaust gas with the reducing agent, perceptibly improving the homogenization of the mixture.

The mixing line desired for adequate homogenization is significantly shortened, so that the reducing agent can be introduced into the exhaust gas discharge system at a shorter distance upstream of the exhaust gas aftertreatment system. In this way, a denser packaging of the drive unit is possible.

The path of the hot exhaust gases up to exhaust gas aftertreatment system is shortened, whereby the exhaust gases have less time to cool down relative exhaust system with the reductant injector arranged in the exhaust passage. The thermal inertia of the part of the exhaust gas discharge system between the cylinder outlets and the exhaust gas aftertreatment system advantageously diminishes, whereby the exhaust gas aftertreatment systems reach their operating temperature or light-up temperature more quickly, in particular following a cold start of the internal combustion engine.

The provision of a mixing device, which regularly offers the exhaust gas a variable flow resistance and an associated pressure fall, in the exhaust gas discharge system may be omitted, thereby decreasing a cost and complexity of the exhaust system while also minimizing packaging constraints.

Embodiments of the internal combustion engine may further comprise where an injection nozzle is arranged in each metering line.

An injection nozzle supports the broad distribution of the exhaust gas/reducing agent mixture in the exhaust gas discharge system or in the outlet region of the turbine casing, which further promotes the mixing of the exhaust gas with the reducing agent and hence the homogenization.

An injection nozzle as such may be arranged in the metering line, or the metering line itself may be configured or formed in portions, preferably in the mouth region, for example, at the outlet opening, as a nozzle, e.g., in the form of a nozzle.

Embodiments of the internal combustion engine may comprise where the at least one mixing chamber is connected to the outlet region via at least one metering line.

In the present case, the metering line does not open into the exhaust gas discharge system at any arbitrary point between the turbine impeller and the exhaust gas aftertreatment system, but in the outlet region of the turbine casing and hence into the exhaust gas discharge system directly downstream of the impeller.

In this way, the mixing line used for homogenization is shortened as much as possible, wherein additionally the advantageous effect may be exploited that the exhaust gas flow through the turbine is particularly turbulent after leaving the turbine impeller. The latter promotes a mixing of the exhaust gas with the reducing agent, or homogenization.

Embodiments of the internal combustion engine may comprise where the turbine casing has a mixing chamber which is connected to a flow channel carrying exhaust gas upstream of the outlet region via an exhaust gas supply line.

In the present case, the turbine casing has a single mixing chamber, wherein only one exhaust gas supply line is provided to supply this mixing chamber. Equipping the turbine casing with mixing chambers and supply lines is associated with the removal of casing material, which weakens the strength of the turbine, as such, arranging the mixing chamber integrally with the turbine present structural challenges. Furthermore, a turbine casing may be a casting in which lines and chambers are produced by sand cores during casting. The more chambers and lines are provided, the more complex and cost-intensive is the production of the casing by means of casting.

Embodiments of the internal combustion engine may comprise where the at least one mixing chamber is formed as a ring channel which at least in portions surrounds the exhaust gas discharge system downstream of the at least one impeller, wherein several metering lines depart from the ring channel and each open into the exhaust gas discharge system on the exhaust gas side via an outlet opening.

Embodiments of the internal combustion engine may comprise where the at least one ring channel surrounds the exhaust gas discharge system completely.

With this design of each mixing chamber as a ring channel, it is possible to introduce the exhaust gas/reducing agent mixture into the exhaust gas discharge system at several points between the turbine impeller and the exhaust gas aftertreatment system. This procedure supports or simplifies the broad distribution of the exhaust gas/reducing agent mixture in the exhaust gas discharge system or outlet region of the turbine casing, wherein again the mixing of the exhaust gas with the reducing agent, and hence homogenization, are promoted.

In this context, embodiments of the internal combustion engine may comprise where the at least one mixing chamber is formed as a ring channel which at least in portions surrounds the outlet region downstream of the at least one impeller, wherein several metering lines depart from the ring channel and each open into the outlet region on the exhaust gas side via an outlet opening.

In the present case, the metering lines open into the outlet region of the turbine casing and hence into the exhaust gas discharge system directly downstream of the impeller, whereby advantageously homogenization is further improved and the mixing line further shortened.

Embodiments of the internal combustion engine may comprise where the turbine is the turbine of an exhaust gas turbocharger which comprises the turbine and a compressor arranged on the same shaft.

Charging is a suitable method for increasing the power of an internal combustion engine with unchanged capacity, or reducing the capacity for the same power. In any case, charging leads to an increase in the power-to-volume ratio and a more favorable power-to-mass ratio. If the capacity is reduced, the load collective is shifted towards higher loads at which the specific fuel consumption is lower. Charging, in combination with suitable gear ratios, may also allow so-called downspeeding in which a lower specific fuel consumption can also be achieved.

Consequently, in the development of internal combustion engines, charging supports the constant aim of minimizing fuel consumption by improving the efficiency of the internal combustion engine.

In an exhaust gas turbocharger, a compressor and a turbine are arranged on the same shaft. The hot exhaust gas stream is supplied to the turbine and expands, emitting energy to the turbine, whereby the shaft is set in rotation. The energy emitted from the exhaust gas stream to the turbine and finally to the shaft is used to drive the compressor which is also arranged on the shaft. The compressor conveys and compresses the charge air supplied to it, thus charging the cylinders. Advantageously, a charge-cooler is provided in the intake system downstream of the compressor, which cools the compressed charge air before it enters the at least one cylinder. The cooler lowers the temperature and hence increases the density of the charge air, so the cooler also contributes to a better filling of the cylinders, i.e. a greater air mass. Compression is achieved by cooling.

Embodiments of the internal combustion engine may comprise where the at least one exhaust gas aftertreatment system, which for at least part of the time requires a supply with reducing agent, is a selective catalytic converter for reducing nitrogen oxides.

In particular, a selective catalytic converter desired a thorough mixing of the exhaust gas with the reducing agent so that most if not all surfaces of the selective catalytic converter receive the reducing agent.

Because of the toxicity of ammonia ($NH_3$), ammonia in pure form is not usually stored in motor vehicles and provided as reducing agent. Rather, often urea is used as a starting point for the production of ammonia, or fuel is used as the reducing agent.

Embodiments of the internal combustion engine are also advantageous in which the at least one exhaust gas aftertreatment system, which for at least part of the time requires a supply with reducing agent, is a storage catalyst for reducing nitrogen oxides.

During the regeneration phase, the nitrogen oxides ($NO_x$) are released and substantially converted into nitrogen dioxide ($N_2$), carbon dioxide ($CO_2$) and water ($H_2O$). The temperature of the storage catalyst may lie in a temperature window between 200° C. and 450° C., so that firstly rapid reduction is ensured and secondly desorption does not take place without conversion of the released nitrogen oxides $NO_x$, which may be triggered by excessive temperatures.

One difficulty in the use of a storage catalyst arises from the sulfur contained in the exhaust gas, which is also adsorbed and may be removed regularly by so-called desulphurization. For this, the storage catalyst may be heated to high temperatures, normally between 600° C. 700° C., and supplied with a reducing agent such as unburnt hydrocarbons (e.g., a fuel injection).

Embodiments of the internal combustion engine may comprise where the at least one exhaust gas aftertreatment system, which for at least part of the time demands a supply with reducing agent, is a particle filter for reducing soot emissions.

Embodiments of the internal combustion engine may comprise where the reducing agent is fuel.

Because of the toxicity of ammonia, and the fact that if an SCR catalyst malfunctions, not only nitrogen oxides but also ammonia can reach the environment, it may be desired to use fuel as a reducing agent. No additional container, other than the fuel tank, is needed for storage of reducing agent if fuel is used for reduction.

Embodiments of the internal combustion engine may comprise where the reducing agent is urea.

The urea may be stored and provided in liquid form as a watery solution. It is however also possible to provide the urea in solid form. One advantage is that urea in solid form is less voluminous, and solid urea is distinguished by a higher ammonia content than the watery solution. The storage container may therefore have a smaller storage volume, which constitutes a substantial advantage, in particular in relation to use in motor vehicles in which the aim is as dense and effective a packaging as possible. Secondly, assuming the same volumes of the storage containers, the intervals at which the container is to be refilled are extended in comparison with the variant in which urea is provided as a watery solution. Also, it may be taken into account that a watery urea solution has a comparatively high freezing point, and the solution transforms from the liquid form into the frozen, i.e. solid, form even at around 13° C. This may demand complex and cost-intensive measures or devices for frost protection or thawing.

Nonetheless, embodiments of the internal combustion engine may be advantageous in which the reducing agent is ammonia.

The second partial object on which the disclosure is based, namely the provision of a method for operating an internal combustion engine of the type described above, is achieved by method for operating an internal combustion engine in which a selective catalytic converter for reducing nitrogen oxides is arranged in the exhaust gas discharge system, wherein liquid urea is introduced into the at least one mixing chamber via the device in order to enrich the exhaust gas with reducing agent.

According to the previous examples, internal combustion engines are fitted with various exhaust gas aftertreatment systems for reducing the pollutant emissions.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a first embodiment of the turbine 2 arranged in the exhaust gas discharge system 1, in a partial section along the shaft 4a of the turbine impeller 4.

The turbine 2 is a radial turbine which comprises a turbine casing 2a and an impeller 4, which is arranged in this turbine casing 2a and mounted on a rotatable shaft 4a.

The turbine casing 2a has an inlet region 6 for the supply of exhaust gas and an outlet region 7 for the discharge of exhaust gas. The inlet region 6 is situated upstream of the impeller 4. In order for the exhaust gas to be able to flow radially onto the rotor blades of the impeller 4, in the inlet region 6 the turbine casing 2a is formed as a spiral housing running around the impeller 4 and extending in a spiral around the impeller 4. The outlet region 7 belonging to the exhaust gas discharge system 1 is arranged downstream of the impeller 4 and also directly adjoins the impeller 4. The outlet region 7 runs coaxially to the shaft 4a of the impeller 4.

In the present case, the turbine 2 is a single-flow turbine, wherein a flow channel 5 carrying exhaust gas connects the inlet region 6 to the outlet region 7 via the impeller 4.

The turbine casing 2a has a mixing chamber 3a which is connected to the flow channel 5 carrying the exhaust gas in the region of the impeller 4 via an exhaust gas supply line 3b, and to the exhaust gas discharge system 1 downstream of the impeller 4 via several metering lines 3c.

The metering lines 3c open into the outlet region 7 of the turbine casing 2a and thus into the exhaust gas discharge system 1 directly downstream of the impeller 4. Consequently, the mixing line used for homogenization is shortened as much as possible.

Using a device 3, reducing agent, for example liquid urea, may be introduced into the mixing chamber 3a, for which an injector 3' of the device 3 is actuated. As such, the injector 3' is positioned to inject directly into the mixing chamber 3a. The hot exhaust gas present in the mixing chamber 3a and the introduced reducing agent are mixed. The exhaust gas/reducing agent mixture is introduced into the exhaust gas discharge system 1 downstream of the impeller 4 via several metering lines 3c, whereby the exhaust gas is enriched with reducing agent upstream of the exhaust gas aftertreatment system (not shown).

The exhaust gas is conveyed out of the exhaust gas discharge system 1 into the mixing chamber 3a and, together with the introduced reducing agent, back into the exhaust gas discharge system 1 under pressure, since the exhaust gas pressure at the extraction point of the exhaust gas in the impeller region, e.g., at the inlet opening 3b' of the exhaust gas supply line 3b, is higher than the pressure at the point at which the mixture of exhaust gas and reducing agent is introduced into the exhaust gas discharge system 1, e.g., at the outlet openings 3c' of the metering lines 3c.

Also, the liquid reducing agent at least partially evaporates on introduction into the hot exhaust gas. The evaporation of the introduced reducing agent increases the pressure in the mixing chamber 3a and the pressure of the exhaust gas/reducing agent mixture. A self-conveying effect is created in which the exhaust gas/reducing agent mixture escapes into the exhaust gas discharge system 1 and is thus conveyed.

In the present case, the mixing chamber 3a is formed as a ring channel which completely traverses a circumference of the exhaust gas discharge system 1 or the outlet region 7 of the turbine casing 2a. In this way, it is possible to introduce the exhaust gas/reducing agent mixture into the exhaust gas discharge system 1 at several points and achieve a broad distribution of the exhaust gas/reducing agent mixture in the exhaust gas discharge system 1. The mixing of the exhaust gas with the reducing agent, and hence the homogenization, are promoted.

In addition, the metering lines 3c may be formed as nozzles in their opening region, e.g., at the outlet openings 3c'.

Thus, in one example, the example of FIG. 1 illustrates a turbine 1 comprising a mixing chamber 3a extending around an entire circumference of an outlet 7 of the turbine. Exhaust gases may flow through at least one exhaust gas supply line 3b to the mixing chamber 3a after flowing through an impeller 4 of the turbine 1. The exhaust gas in the mixing chamber 3a may travel around an entire circumference of the outlet 7 due to the annular shape of the mixing chamber 3a. The injector 3', which is positioned to inject directly into the mixing chamber 3a, injects a reductant into the mixing chamber 3a which may mix and flow with around at least a portion of the mixing chamber 3a. The mixture of exhaust gas and reductant may re-enter the exhaust passage via a plurality of outlet openings 3c' of the metering lines 3c. As illustrated, the plurality of outlet openings 3c' are arranged radially distinct positions such that the mixture is reintroduced to an exhaust system at a variety of positions to promote increased homogenization with the mixture and exhaust gas in the outlet 7. By doing this, reduction of an aftertreatment device may be enhanced relative to other reductant systems with mixers. In one example, the reduction is enhanced due to the increased temperatures of the exhaust gas owing to the more compact arrangement of the exhaust system due to the mixing chamber being integrally formed in the turbine. By allowing the catalyst to receive hotter exhaust gases, a homogeneity of the exhaust gas and mixture may increase.

FIG. 2 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, selective catalytic reduction (SCR) device, particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

The engine system may further comprise a turbine 180, a compressor 182, and a shaft 181 mechanically coupling the turbine 180 to the compressor 182. In one example, the turbine 180 may be a non-limiting example of the turbine 1 of FIG. 1. As such, the turbine 180 may comprise a mixing chamber integrally formed into a casing of the turbine along with an injector positioned to inject directly into the mixing chamber.

A bypass passage 184 is illustrated proximally to the turbine 180, wherein the bypass passage 184 may route a portion of exhaust gases in the exhaust passage 135 around the turbine 180 based on a position of a wastegate 186. By doing this, a turbine speed may be reduced, which may decrease boost provided by the compressor to the engine 110. A method for adjusting operation of the wastegate.

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

Turning now to FIG. 3, it shows a method 300 for adjusting the reductant injector positioned to inject into the mixing chamber formed in the turbine in response to at least a turbine speed and a wastegate position. Instructions for carrying out method 300 may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

The method 300 begins at 302, which includes determining, estimating, and/or measuring current engine operating parameters. Current engine operating parameters may include, but are not limited to one or more of throttle position, manifold vacuum, engine speed, engine load, engine temperature, ambient temperature, vehicle speed, and air/fuel ratio.

The method 300 proceeds to 304, which includes determining if reductant is desired. Reductant may be desired in response to a catalyst arranged downstream of a turbine being fully loaded. For example, a particulate filter may request a regeneration, which may be facilitated via reductant, such as fuel, being introduced into an exhaust flow to increase exhaust gas temperatures. Additionally or alternatively, an SCR device may request reductant in response to an ammonia slip no longer being sensed downstream of the SCR device. As such, an insufficient amount of reductant may be arranged within the SCR device. Additionally or alternatively, in one example, a lean $NO_x$ trap may request reductant in response to an amount of $NO_x$ stored on the trap being greater than a threshold amount. In some examples, additionally or alternatively, the reductant may be desired periodically following a duration of time.

At any rate, if reductant is not desired, then the method 300 proceeds to 306, which includes maintaining current operating parameters and does not inject reductant via the injector into the mixing chamber integrally formed in the turbine.

If reductant is desired, then the method 300 proceeds to 308, which includes determining a wastegate position. The wastegate position may be estimated via a combination of an amount of exhaust gas produced and a turbine speed and/or an amount of boost. Additionally or alternatively, the wastegate position may be determined via measurement of an amount of an actuator is actuated to open or close the wastegate. The wastegate may be actuated to a fully closed position, a fully open position, and to positions therebetween. The fully closed position may allow a minimal amount of exhaust gas to flow through a bypass passage in which in the wastegate is arranged. Conversely, the fully open position may allow a maximum amount of exhaust gas to flow through the bypass passage. The positions between the fully open and closed positions may include more closed positions, which may more closely resemble the fully closed position rather than the fully open position, and more open positions, which may more closely resemble the fully open position rather than the fully closed position. As such, more exhaust gas flows through the bypass passage when the wastegate is in a more open position than a more closed position. When more exhaust gas flows through the bypass passage, less exhaust gas may flow to the turbine.

The method 300 proceeds to 310, which includes determining a turbine wheel speed (e.g., a rotational speed of the impeller). The turbine speed may be calculated based on an amount of boost provided to the engine. Additionally or alternatively, the turbine speed may be measured via a sensor or other device configured to measure a rotational speed of an impeller of the turbine.

The method 300 proceeds to 312, which includes determining if a turbine speed is less than a threshold speed and/or if a wastegate position is greater than a threshold position. The threshold speed may be based on a speed of the turbine where exhaust gas flow therethrough is relatively low, which may result in reduced exhaust gas flow to the mixing chamber in the turbine. The threshold position may correspond to the threshold speed, wherein if the wastegate position is greater than the threshold position, then an amount of exhaust gas bypassing the turbine may be relatively high and may lead to reduced turbine speeds. The reductant injection may be adjusted based on the turbine speed and the wastegate position.

If the turbine speed is not less than the threshold speed and/or if the wastegate position is not greater than the threshold position, then the method 300 proceeds to 314, which may include injecting reductant over a shorter period of time. Thus, a given amount of reductant may be injected over less time via either more frequent injections or higher volume injections due to more exhaust gas flowing to the mixing chamber. As such, a likelihood of reductant impinging onto the mixing chamber surfaces may be reduced while the increased gas flow may further increase mixing of the reductant with exhaust gas in the turbine outlet.

If the turbine speed is less than the threshold speed and/or if the wastegate position is greater than the threshold position, then the method 300 proceeds to 316, which may include injecting reductant over a longer period of time. Thus, the given amount of reductant may be injected over more time via either less frequent injection, a lower volume of injections, or both due to less exhaust gas flowing to the mixing chamber. In such an example, the reductant may not be swept from the mixing chamber as frequently and a delay between injections may be increased.

In some embodiments, additionally or alternatively, the method may include determining if more boost may be tolerated by the engine while the injector is injecting reductant. In one example, the engine may receive more boost than desired and adjust other engine operating parameters to adjust for the increase in boost (e.g., spark timing, fueling, etc.). Additionally or alternatively, if engine operating parameters may not be adjusted, then a portion of the engine power output which exceeds the drive demand may be used to power auxiliary devices, recharge a battery, or perform other tasks. Thus, if more boost may be tolerated, the wastegate may be signaled to actuate to a more closed position, thereby allowing an increased amount of exhaust gas to flow to the turbine, which may result in more exhaust gas flowing to the mixing chamber. By doing this, the injector may inject reductant over a shorter period of time compared to when the wastegate was in a more open position. The wastegate may be change to a position based on engine operating parameters and no longer based on the reductant injection.

Thus, in one example, the method 300 illustrates a method for adjusting operation of the reductant injector positioned to inject directly into the mixing chamber integrally formed in a turbine case of a turbine. The reductant injector may inject over a longer period of time via less frequent injections or lower volume and/or lower pressure injections due to low amounts of exhaust gas flowing to the turbine. Alternatively, the reductant injector may inject over a shorter period of time via more frequent injections or higher volume and/or higher pressure injections due to high amounts of exhaust gas flowing to the turbine. By doing this, operation of the reductant injector may be adjusted to promote increased mixing based on exhaust gas conditions while also mitigating reductant impingement onto surfaces of the mixing chamber, the turbine outlet, and the exhaust passage.

In this way, a mixing chamber is integrally formed in a casing of a turbine without decreasing a durability of the turbine. The technical effect of arranging the mixing chamber in the turbine is to decrease a packaging size of the exhaust system, thereby allowing hotter exhaust gases to reach an aftertreatment device, which may decrease cold-start times. Furthermore, hotter exhaust gases are used to mix with the reductant injection, which may increase an efficiency of the mixing, resulting in an increased homogeneity of the exhaust gas and reductant. Lastly, the arrangement of the mixing chamber downstream of the turbine impeller, which is possible due to the durability of the turbine not being reduced, allows a complexity of an injector to be reduced, which may decrease a manufacturing cost of the turbine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine with an exhaust gas discharge system for discharging exhaust gas from at least one cylinder, the internal combustion engine, comprising:
at least one exhaust gas aftertreatment system is arranged in the exhaust gas discharge system;
an injector is positioned to inject a reducing agent into a mixing chamber upstream of the at least one exhaust gas aftertreatment system; and
a turbine is arranged in the exhaust gas discharge system upstream of the at least one exhaust gas aftertreatment system, wherein a turbine casing contains at least one impeller mounted on a rotatable shaft, wherein an inlet region is upstream of and supplies exhaust gas to the at least one impeller and an outlet region is downstream of and discharges exhaust gas from the at least one impeller, and at least one flow channel fluidly couples the inlet region to the outlet region via the at least one impeller, wherein the mixing chamber is arranged inside walls of the turbine casing and fluidly coupled to the at least one flow channel at a portion of the turbine upstream and radially outside of the outlet region and downstream of the at least one impeller via at least one exhaust gas supply line.

2. The internal combustion engine of claim 1, wherein a plurality of metering lines fluidly couple the mixing chamber to the outlet region.

3. The internal combustion engine of claim 2, wherein the plurality of metering lines are fluidly coupled to different radial locations of the outlet region.

4. The internal combustion engine of claim 1, wherein the mixing chamber comprises a ring shape which at least in portions surrounds the exhaust gas discharge system downstream of the at least one impeller.

5. The internal combustion engine of claim 1, wherein the injector injects the reducing agent for a storage catalyst configured to store nitrogen oxides.

6. The internal combustion engine of claim 1, wherein the injector injects the reducing agent for a selective catalytic reduction device for reducing nitrogen oxides.

7. The internal combustion engine of claim 1, wherein the injector injects the reducing agent for a particle filter for reducing soot emissions.

8. The internal combustion engine of claim 1, wherein the reducing agent is fuel, urea, or ammonia.

9. A system, comprising:
a turbine comprising an impeller and a passage fluidly coupling an outlet of the impeller to a mixing chamber integrally arranged in a casing of the turbine radially outside of an outlet of the turbine, wherein an exhaust gas supply line directs exhaust gas to the mixing chamber; and
an injector is positioned to inject reductant directly into the mixing chamber.

10. The system of claim 9, wherein the mixing chamber comprises a plurality of outlets configured to expel a mixture of exhaust gas and reductant to the outlet of the turbine.

11. The system of claim 10, wherein each of the plurality of outlets are arranged at radially distinct location of the outlet of the turbine.

12. The system of claim 11, wherein each outlet of the plurality of outlets comprises a nozzle shape.

13. The system of claim 9, wherein the mixing chamber comprises an annular shape and extends around the outlet of the turbine, wherein the outlet directs exhaust gases to an exhaust passage housing an aftertreatment device.

14. The system of claim 13, wherein the aftertreatment device is a particle filter, a lean $NO_x$ trap, or a selective catalytic reduction device.

15. A method, comprising:
injecting reductant via an injector directly into a mixing chamber integrally formed in a portion of a turbine downstream of an impeller and radially outside an outlet of a turbine, wherein the mixing chamber receives exhaust gas from downstream of the impeller via a flow channel.

16. The method of claim 15, further comprising expelling a mixture of exhaust gas and reductant from the mixing chamber into the outlet of the turbine downstream of the impeller, wherein the outlet is fluidly coupled to an exhaust passage housing an aftertreatment device.

17. The method of claim 15, adjusting one or more of a duration, a pressure, and a volume of the injecting in response to an impeller speed or a wastegate position.

18. The method of claim 17, wherein adjusting includes one or more of decreasing the duration, increasing the pressure, and increasing the volume in response to the impeller speed being greater than a threshold speed or the wastegate position being less open than a threshold position.

19. The method of claim 17, wherein adjusting includes one or more of increasing the duration, decreasing the pressure, and decreasing the volume in response to the impeller speed being less than a threshold speed or the wastegate position being more open than a threshold position.

* * * * *